US012488761B2

(12) United States Patent
Yang

(10) Patent No.: US 12,488,761 B2
(45) Date of Patent: Dec. 2, 2025

(54) DISPLAY DEVICE AND INTEGRATED DRIVING CIRCUIT

(71) Applicant: LG Display Co., Ltd., Seoul (KR)

(72) Inventor: JunHyeok Yang, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 18/932,390

(22) Filed: Oct. 30, 2024

(65) Prior Publication Data

US 2025/0246157 A1 Jul. 31, 2025

(30) Foreign Application Priority Data

Jan. 31, 2024 (KR) ........................ 10-2024-0015370

(51) Int. Cl.
*G09G 3/3291* (2016.01)
*G09G 3/3258* (2016.01)

(52) U.S. Cl.
CPC ......... *G09G 3/3291* (2013.01); *G09G 3/3258* (2013.01); *G09G 2300/0852* (2013.01); *G09G 2300/0861* (2013.01); *G09G 2310/06* (2013.01)

(58) Field of Classification Search
CPC ............... G09G 3/3291; G09G 3/3258; G09G 2300/0852; G09G 2300/0861; G09G 2310/06
USPC .......................................................... 345/208
See application file for complete search history.

(56) References Cited

U.S. PATENT DOCUMENTS

| | | | | |
|---|---|---|---|---|
| 2009/0213046 A1* | 8/2009 | Nam | G09G 3/3233 | 345/76 |
| 2012/0050274 A1* | 3/2012 | Yoo | G09G 3/003 | 345/212 |
| 2020/0135091 A1* | 4/2020 | Kim | G09G 3/3233 | |
| 2020/0210010 A1* | 7/2020 | Kim | G09G 3/3233 | |
| 2020/0380906 A1* | 12/2020 | Kim | G09G 3/3258 | |
| 2023/0037207 A1* | 2/2023 | Hong | G09G 3/3233 | |
| 2023/0046059 A1* | 2/2023 | Park | G09G 3/3258 | |
| 2023/0122681 A1* | 4/2023 | Park | G09G 3/3291 | 345/690 |
| 2023/0143178 A1* | 5/2023 | Kim | G09G 3/3233 | 345/212 |
| 2023/0345782 A1* | 10/2023 | Kim | H10K 59/353 | |
| 2024/0194129 A1* | 6/2024 | Hong | G09G 3/3233 | |
| 2025/0031531 A1* | 1/2025 | Han | G09G 3/3233 | |

* cited by examiner

*Primary Examiner* — Tom V Sheng
(74) *Attorney, Agent, or Firm* — Birch, Stewart, Kolasch & Birch, LLP

(57) ABSTRACT

A display device can include a display panel having a plurality of subpixels defined by a plurality of data lines, a plurality of reference voltage lines, and a plurality of gate lines are arranged. The display device further includes a source driver integrated circuit configured to drive the plurality of data lines and the plurality of reference voltage lines, and an integrated driving unit configured to alternately output a data voltage and a reference voltage to one line shared by one data line among the plurality of data lines and one reference voltage line among the plurality of reference voltage lines.

16 Claims, 15 Drawing Sheets

DISPLAY DEVICE AND INTEGRATED DRIVING CIRCUIT

CROSS-REFERENCE TO RELATED APPLICATION

This application claims priority to Korean Patent Application No. 10-2024-0015370, filed in the Republic of Korea on Jan. 31, 2024, the entire contents of which are hereby expressly incorporated by reference for all purposes as if fully set forth herein into the present application.

BACKGROUND

Field

Embodiments of the disclosure relate to a display device and an integrated driving circuit.

Discussion of the Related Art

Recently, organic light emitting display devices, which have been in the spotlight as display devices, have the advantages of fast response speed, high luminous efficiency, brightness, and viewing angle by adopting self-emissive organic light emitting diodes (OLEDs).

SUMMARY OF THE DISCLOSURE

Embodiments of the disclosure provide a display device and an integrated driving circuit that can increase the number of lines between a source drive integrated circuit and a display panel.

Embodiments of the disclosure provide a display device and an integrated driving circuit that can receive a data voltage for data driving and a reference voltage through the same integrated line.

Embodiments of the disclosure can provide a display device and an integrated driving circuit that can reduce the number of wiring lines by constituting a data line and a reference voltage line as an integrated structure.

A display device according to embodiments of the disclosure can comprise a display panel where a plurality of subpixels defined by a plurality of data lines, a plurality of reference voltage lines, and a plurality of gate lines are arranged, a source driver integrated circuit configured to drive the plurality of data lines and the plurality of reference voltage lines, and an integrated driving unit alternately outputting a data voltage and a reference voltage to one line shared by one data line among the plurality of data lines and one reference voltage line among the plurality of reference voltage lines.

An integrated driving circuit according to embodiments of the disclosure can comprise a first input node disposed in a source driver integrated circuit to receive a data voltage, a second input node disposed in the source driver integrated circuit to receive a reference voltage, an integrated line electrically connecting the first input node and the second input node in common, a first output node disposed in a display panel and connected between the integrated line and the data line, a second output node disposed in the display panel and connected between the integrated line and the reference voltage line, a first switch element switching connection between the first output node and the data line, a second switch element switching connection between the second output node and the reference voltage line, a third switch element switching connection between the first input node and the integrated line, and a fourth switch element switching connection between the second input node and the integrated line.

According to embodiments of the disclosure, it is possible to output a data voltage for data driving and a reference voltage for reference voltage driving to the same integrated line IL1, as well as to integrate and provide data driving and reference voltage driving by using an integrated driving unit. Accordingly, it is possible to significantly decrease the number of output lines of the integrated driving unit.

Thus, as the integrated driving unit according to the present embodiments has only a small number of output channels, circuit design can be easy and simplified.

Further, it is possible to decrease the number of lines between the display panel and the source drive integrated circuit by using an integrated driving unit according to the present embodiments. Thus, it is possible to lighten the display device by increasing the use efficiency relative to the area occupied by the data lines and reference voltage lines as compared with the related art.

BRIEF DESCRIPTION OF THE DRAWINGS

The above and other objects, features, and advantages of the disclosure will be more clearly understood from the following detailed description, taken in conjunction with the accompanying drawings, in which.

DETAILED DESCRIPTION OF THE EMBODIMENTS

Figure 1:
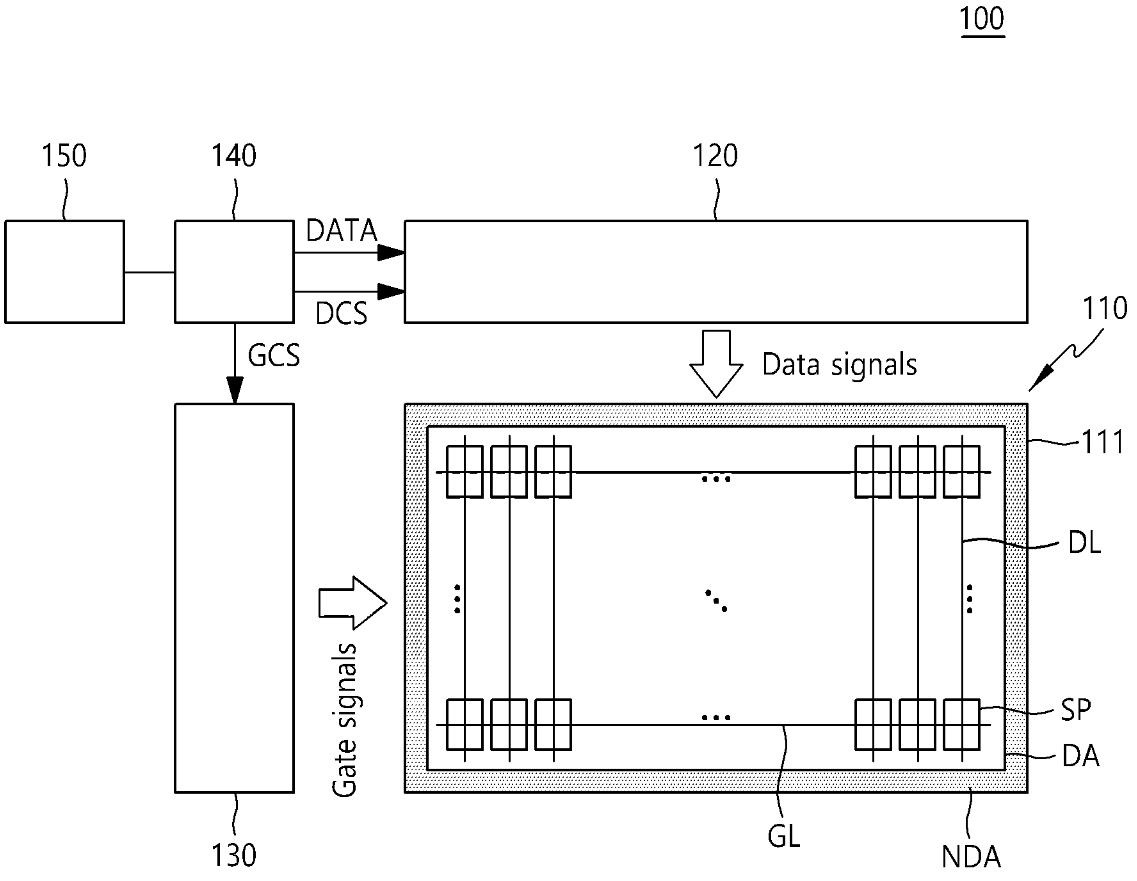
FIG. 1 is a view schematically illustrating a system configuration of a display device according to embodiments of the disclosure.

In the following description of examples or embodiments of the disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the disclosure, detailed descriptions of well-known functions and components incorporated herein will be omitted when it is determined that the description can make the subject matter in some embodiments of the disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise. Further, the term "can" fully encompasses all the meanings and coverages of the term "may."

Terms, such as "first", "second", "A", "B", "(A)", or "(B)" can be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element can be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms can be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that can be caused by various factors (e.g., process factors, internal or external impact, noise, etc.) even when a relevant description is not specified. Further, the term "may" fully encompasses all the meanings of the term "can".

Hereinafter, various embodiments of the disclosure are described in detail with reference to the accompanying drawings. All the components of each system and each device according to all embodiments of the present disclosure are operatively coupled and configured.

FIG. 1 is a view schematically illustrating a system configuration of a display device according to embodiments of the disclosure.

Referring to FIG. 1, a display device 100 according to the present embodiments can include a display panel 110 where a plurality of data lines DL and a plurality of gate lines GL are arranged, and a plurality of subpixels SP defined by the plurality of data lines DL and the plurality of gate lines GL are arranged in a matrix type and a driving circuit for driving the display panel 110.

From a functional point of view, the driving circuit can include a data driving circuit 120 driving the plurality of data lines DL, a gate driving circuit 130 driving the plurality of gate lines GL, and a controller 140 controlling the data driving circuit 120 and the gate driving circuit 130.

In the display panel 110, the plurality of data lines DL and the plurality of gate lines GL can be disposed to cross each other. For example, the plurality of gate lines GL can be arranged in rows or columns, and the plurality of data lines DL can be arranged in columns or rows. For ease of description, it is assumed below that the plurality of gate lines GL are arranged in rows, and the plurality of data lines DL are arranged in columns.

In the display panel 110, other types of lines, in addition to the plurality of data lines DL and the plurality of gate lines GL, can be disposed.

The controller 140 can supply image data DATA to the data driving circuit 120.

Further, the controller 140 can control the operation of the data driving circuit 120 and the gate driving circuit 130 by supplying various data control signals DCS and gate control signals GCS necessary for the driving operation of the data driving circuit 120 and the gate driving circuit 130.

The controller 140 starts scanning according to a timing implemented in each frame, converts input image data input from the outside into image data DATA suited for the data signal format used in the data driving circuit 120, outputs the image data DATA, and controls data driving at an appropriate time suited for scanning.

To control the data driving circuit 120 and gate driving circuit 130, the controller 140 receives timing signals, such as a vertical sync signal Vsync, horizontal sync signal Hsync, input data enable signal (Data Enable, DE), or clock signal CLK form the outside (e.g., a host system), generate various control signals, and outputs the control signals to the data driving circuit 120 and gate driving circuit 130.

As an example, to control the gate driving circuit 130, the controller 140 outputs various gate control signals GCS including a gate start pulse GSP, a gate shift clock GSC, and a gate output enable signal (Gate Output Enable, GOE).

To control the data driving circuit 120, the controller 140 outputs various data control signals DCS including, e.g., a source start pulse SSP, a source sampling clock SSC, and a source output enable signal (Source Output Enable, SOE).

The controller 140 can be a timing controller used in typical display technology, or a control device that can perform other control functions as well as the functions of the timing controller.

The controller 140 can be implemented as a separate component from the data driving circuit 120, or the controller 140, along with the data driving circuit 120, can be implemented as an integrated circuit.

The data driving circuit 120 receives the image data DATA from the controller 140 and supply data voltage to the plurality of data lines DL, thereby driving the plurality of data lines DL. Here, data driving circuit 120 is also referred to as a 'source driving circuit.'

The data driving circuit 120 can include a shift register, a latch circuit, a digital-to-analog converter (DAC), and an output buffer.

In some cases, the data driving circuit 120 can further include one or more analog-digital converters ADC.

The gate driving circuit 130 sequentially drives the plurality of gate lines GL by sequentially supplying scan signals to the plurality of gate lines GL. Here, gate driving circuit 130 is also referred to as a 'scan driving circuit.'

The gate driving circuit 130 can include, e.g., a shift register and a level shifter.

The gate driving circuit 130 sequentially supplies scan signals of On voltage or Off voltage to the plurality of gate lines GL under the control of the controller 140.

When a specific gate line is opened by the gate driving circuit 130, the data driving circuit 120 converts the image data DATA received from the controller 140 into an analog data voltage and supplies the analog data voltage to the plurality of data lines DL.

The data driving circuit 120 can be positioned on only one side (e.g., the top or bottom side) of the display panel 110 and, in some cases, the data driving circuit 120 can be positioned on each of two opposite sides (e.g., both the top and bottom sides) of the display panel 110 depending on, e.g., driving schemes or panel designs.

The gate driving circuit 130 can be positioned on only one side (e.g., the left or right side) of the display panel 110 and, in some cases, the gate driving circuit 130 can be positioned on each of two opposite sides (e.g., both the left and right sides) of the display panel 110 depending on, e.g., driving schemes or panel designs.

The data driving circuit 120 can include at least one source driver integrated circuit SDIC.

Each source driver integrated circuit SDIC can be connected, in a tape automated bonding (TAB) type or chip-on-glass (COG) type, to the bonding pad of the display panel 110 or can be disposed directly on the display panel 110. In some cases, each source driver integrated circuit SDIC can be integrated and disposed on the display panel 110. Each source driver integrated circuit SDIC can be implemented in a chip-on-film (COF) type. In this case, each source driver integrated circuit (SDIC) can be mounted on a circuit film and be electrically connected with the data lines DL of the panel 110 through the circuit film.

In the gate driving circuit 130, one or more gate driver integrated circuits (ICs) GDIC can be connected to the bonding pad of the display panel 110 in a TAB or COG type. Further, the gate driving circuit 130 can be implemented in a gate-in-panel (GIP) type and be directly disposed on the display panel 110. Further, the gate driving circuit 130 can be implemented in a chip-on-film (COF) type. In this case, each gate driver integrated circuit GDIC included in the gate driving circuit 130 can be mounted on a circuit film and be electrically connected with the gate lines GL of the display panel 110 through the circuit film.

Figure 2:
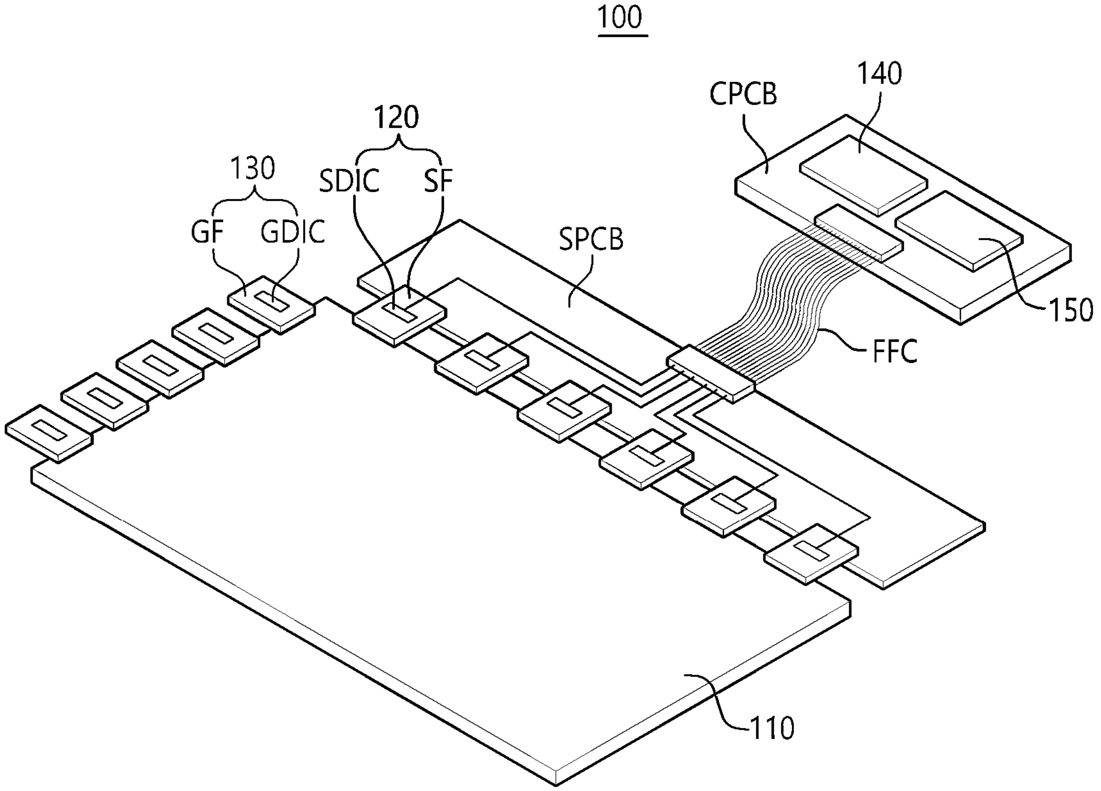
FIG. 2 is a view schematically illustrating a configuration of a display device according to an embodiment of the disclosure.

FIG. 2 is a view schematically illustrating a configuration of a display device according to an embodiment of the disclosure.

Referring to FIG. 2, in the display device 100 according to embodiments of the disclosure, the source driving integrated circuit SDIC included in the data driving circuit 130 and the gate driving integrated circuit GDIC included in the gate driving circuit 120 are implemented in the chip-on-film (COF) type among various types (e.g., TAB, COG, or COF).

One or more gate driving integrated circuits GDIC included in the gate driving circuit 120 each can be mounted on a gate film GF, and one side of the gate film GF can be electrically connected with the display panel 110. Lines for electrically connecting the gate driving integrated circuit GDIC and the display panel 110 can be disposed on the gate film GF.

The gate driving circuit 120 can be located only on one side of the display panel 110 or on each of two opposite sides according to driving methods. The gate driving circuit 120 can be implemented in a gate-in-panel GIP) form which is embedded in the bezel area of the display panel 110.

Likewise, one or more source driving integrated circuits SDIC included in the data driving circuit 130 each can be mounted on the source film SF, and one side of the source film SF can be electrically connected with the display panel 110. Lines for electrically connecting the source driver integrated circuit SDIC and the display panel 110 can be disposed on the source film SF.

The display device 100 can include a plurality of source driving integrated circuits SDIC and a printed circuit board for circuit connection between other devices. The printed circuit board can include, e.g., at least one source printed circuit board SPCB and a control printed circuit board CPCB for mounting control components and various electric devices.

In an embodiment, the other side of the source film SF where the source driving integrated circuit SDIC is mounted can be connected to at least one source printed circuit board SPCB. In other words, one side of the source film SF where the source driving integrated circuit SDIC is mounted can be electrically connected with the display panel 110, and the other side thereof can be electrically connected with the source printed circuit board SPCB.

The controller 140 and the power management circuit (power management IC) 150 can be mounted on the control printed circuit board CPCB. The controller 140 can control the operation of the data driving circuit 130 and the gate driving circuit 120. The power management circuit 150 can supply driving voltage or current to the display panel 110, the data driving circuit 130, and the gate driving circuit 120 and control the supplied voltage or current.

At least one source printed circuit board SPCB and control printed circuit board CPCB can be circuit-connected through at least one connection member. The connection member can include, e.g., a flexible printed circuit FPC or a flexible flat cable FFC.

In this case, the connection member connecting the at least one source printed circuit board SPCB and control printed circuit board CPCB can be varied depending on the size and type of the display device 100. The at least one source printed circuit board SPCB and control printed circuit board CPCB can be integrated into a single printed circuit board.

In the so-configured display device 100, the power management circuit 150 transfers a driving voltage necessary for display driving or characteristic value sensing to the source printed circuit board SPCB through the flexible printed circuit FPC or flexible flat cable FFC. The driving voltage transferred to the source printed circuit board SPCB is supplied to emit light or sense a specific subpixel SP in the display panel 110 through the source driving integrated circuit SDIC.

Figure 3:
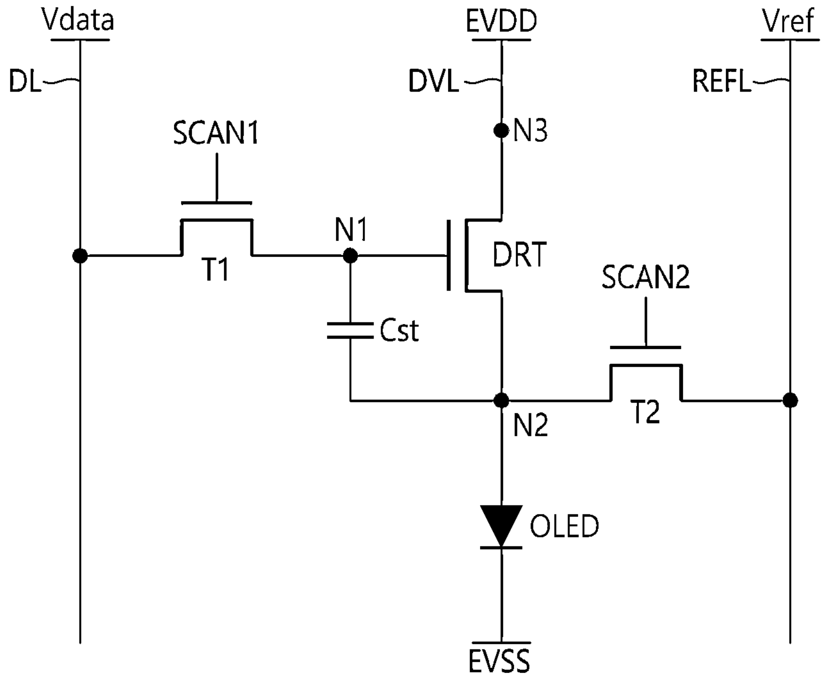
FIG. 3 illustrates example structures of subpixels arranged on a display panel when the display panel is an organic light emitting display panel.

FIG. 3 illustrates example structures of subpixels SP arranged on a display panel 110 when the display panel 110 is an organic light emitting display panel.

Referring to FIG. 3, each of a plurality of subpixels SP can include an organic light emitting diode OLED, a driving transistor DRT for driving the organic light emitting diode OLED, a first transistor T1 for transferring a data voltage Vdata to a first node N1 which is the gate node of the driving transistor DRT, and a storage capacitor Cst for maintaining a voltage during one frame period.

The organic light emitting diode OLED can include a first electrode, an organic light emitting layer, and a second electrode. The first electrode can be an anode electrode. The second electrode can be a cathode electrode to which a low-potential driving voltage EVSS is applied. In some cases, the first electrode can be the cathode electrode, and the second electrode can be the anode electrode. The driving transistor DRT can be electrically connected between the first electrode of the organic light emitting diode OLED and the driving voltage line DVL.

In the driving transistor DRT, the first node N1 is the gate node, and can be electrically connected to the source node or the drain node of the first transistor T1 and receive the data voltage Vdata. The second node N2 is the source node or the drain node and can be electrically connected to the first electrode of the organic light emitting diode OLED. The third node N3 can be electrically connected to the driving voltage line DVL. The first transistor T1 can be controlled by a first scan signal SCAN1 supplied through the gate line GL and be electrically connected between the gate node N1 of the driving transistor DRT and the data line DL. The first transistor T1 can be turned on to apply the data voltage Vdata supplied to the data line DL to the first node N1 which is the gate node of the driving transistor DRT. The storage capacitor Cst can be electrically connected between the first node N1 and second node N2 of the driving transistor DRT. The plurality of lines SL arranged on the display panel 110 can include a data line DL, a driving voltage line DVL, and a gate line GL. Each subpixel SP in the display panel 110 can have a 2T (transistor) 1C (capacitor) structure including two of driving transistor transistors DRT and first transistor T1 and one capacitor Cst. Each subpixel SP in the display panel 110 can further include one or more transistors or can further include one or more capacitors.

For example, as illustrated in FIG. 3, each subpixel SP can be controlled by a second scan signal SCAN2 and can further include a second transistor T2 electrically connected between the second node N2 of the driving transistor DRT and the reference voltage line REFL.

Figure 4A:
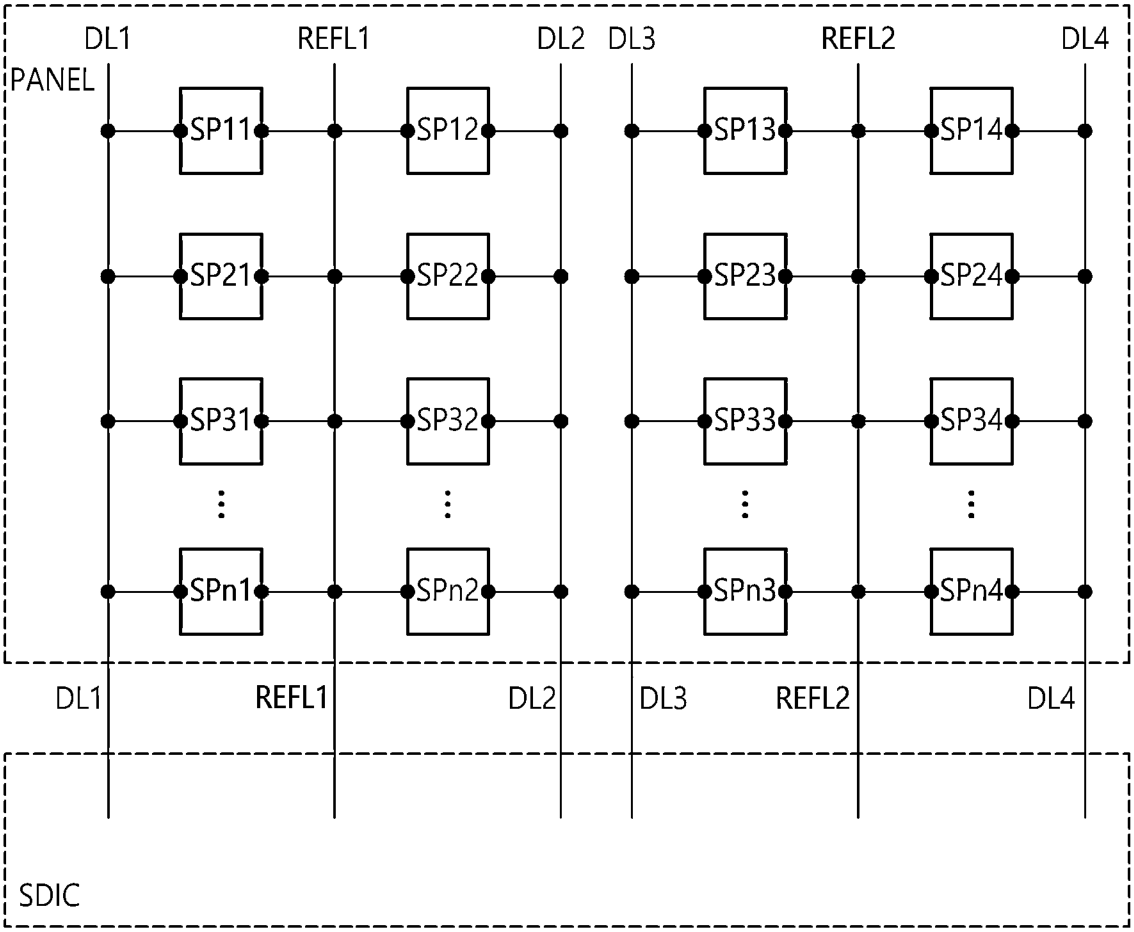
FIGS. 4A and 4B illustrate a corresponding circuit when a data voltage line and a reference voltage line are formed separately, rather than shared, in a display device.
Figure 4B:
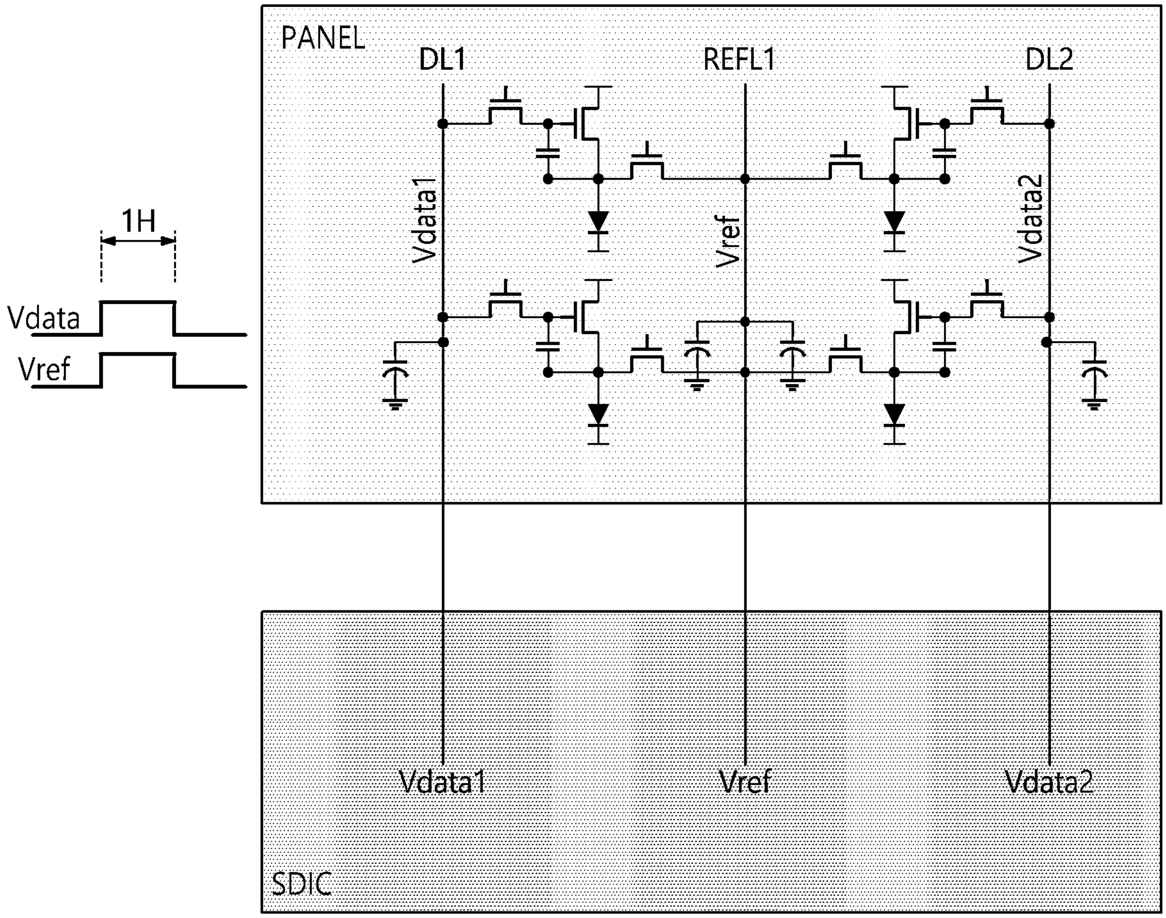

The circuit of FIG. 4A, the circuit of FIG. 4B, and the signal waveform correspond to a case in which the data voltage line and the reference voltage line are separately formed without being shared in the display device 100.

Referring to FIGS. 4A and 4B, a plurality of data lines DL1 to DLn and a plurality of reference voltage lines REFL1 to REFLn are individually formed between the display panel PANEL and the source drive integrated circuit SDIC.

In other words, the number of signal lines is provided between the display panel PANEL and the source drive integrated circuit SDIC to correspond to the data lines and the reference voltage lines. The data lines DL1 to DLn and the plurality of reference voltage lines REFL1 to REFLn can be increased depending on the size, resolution, etc. of the display panel PANEL. This increase in the number of signal lines not only makes it difficult to design the display device 100, but also complicates the structure of driving circuits.

Therefore, embodiments of the disclosure disclose a method for reducing the number of signal lines to address the issues.

Figure 5A:
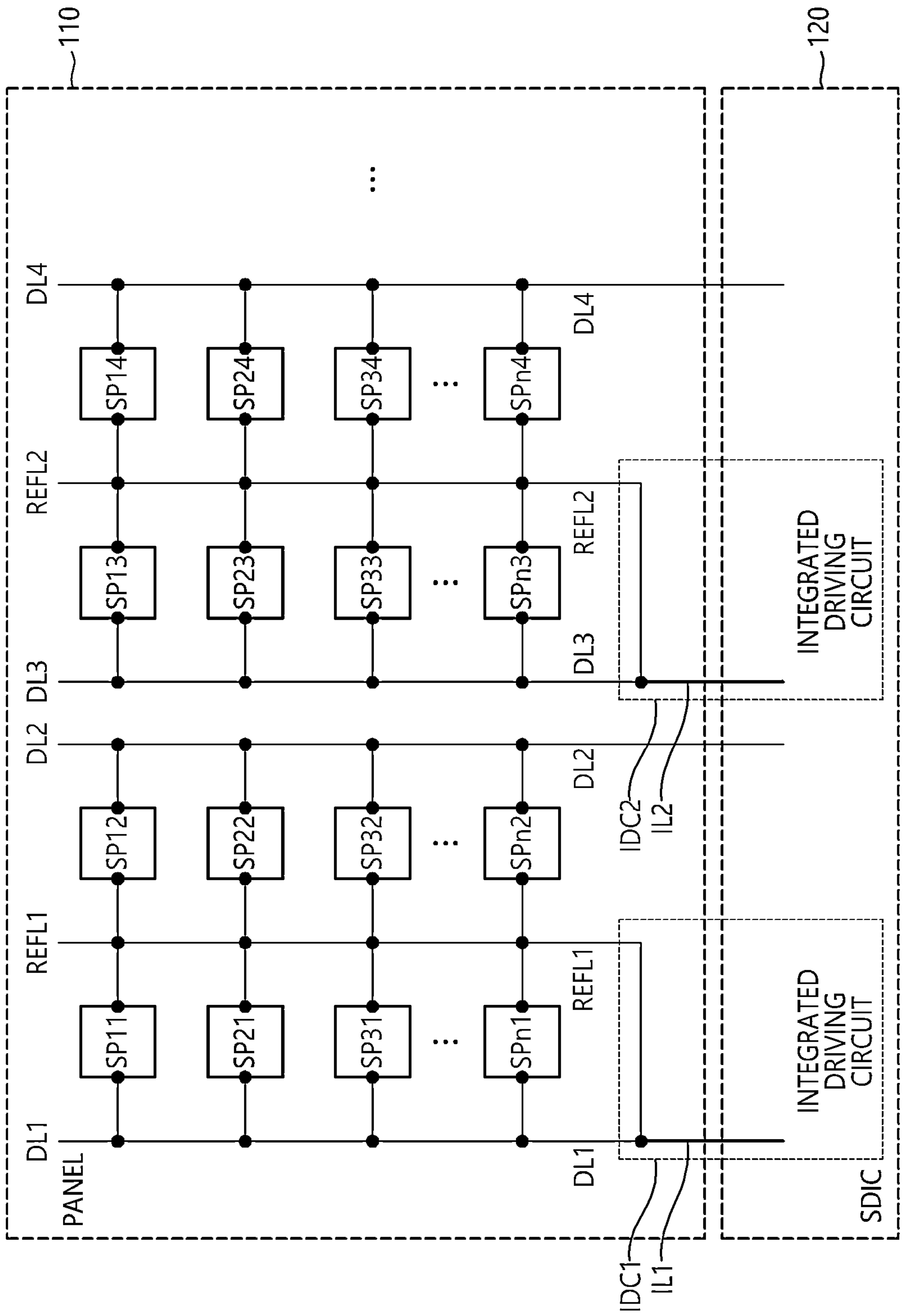
FIGS. 5A, 5B, and 5C illustrate a circuit in which a data voltage line and a reference voltage line are shared according to embodiments of the disclosure.
Figure 5B:
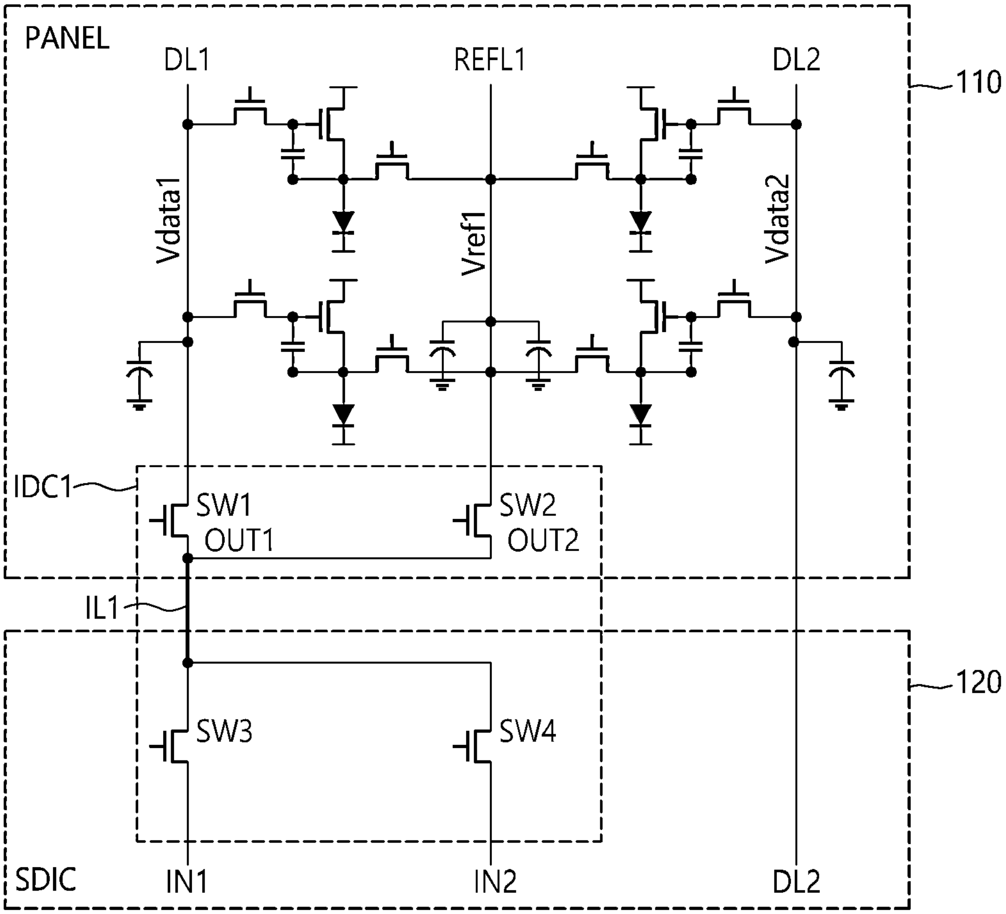
Figure 5C:
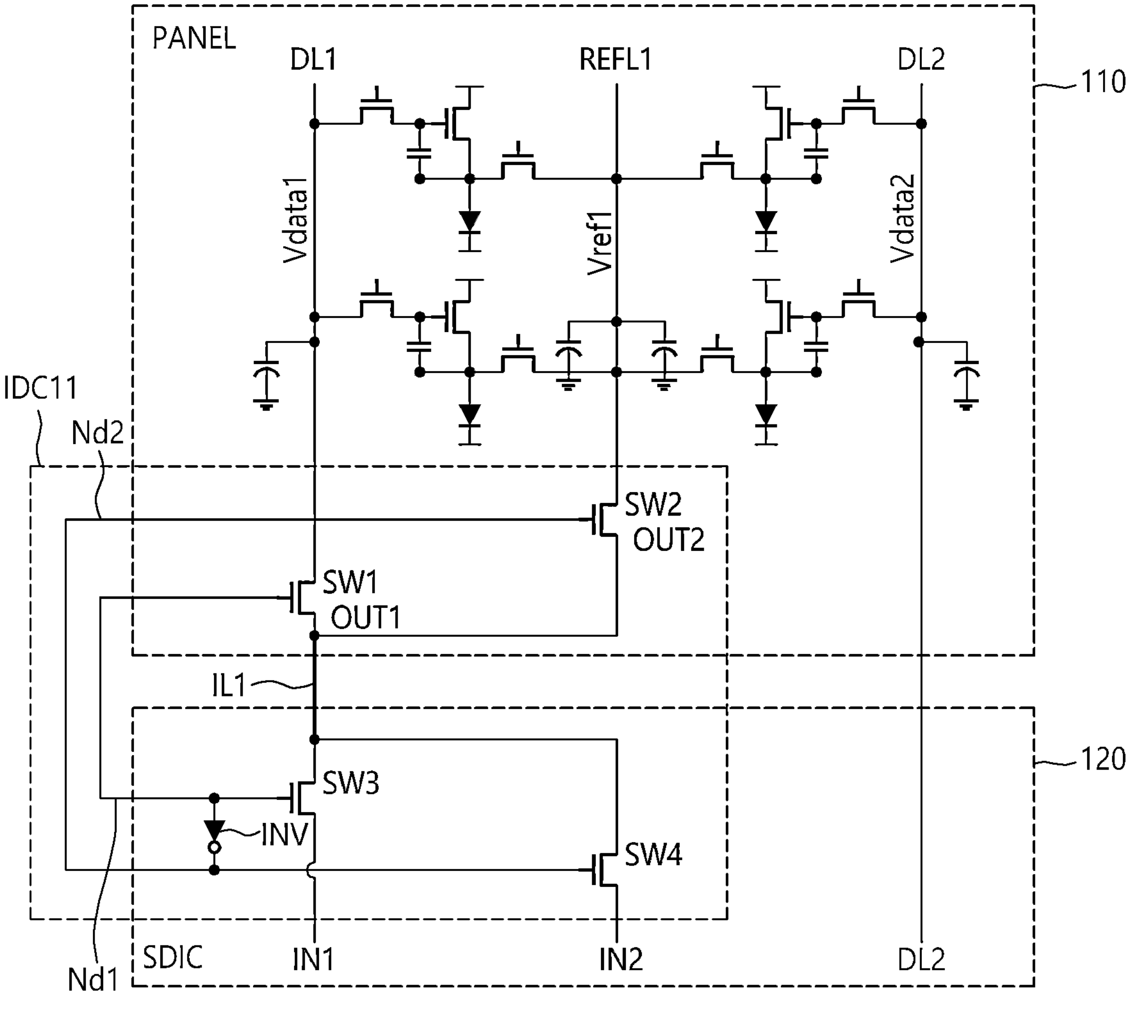

FIGS. 5A, 5B, and 5C illustrate a circuit in which a data voltage line and a reference voltage line are shared according to embodiments of the disclosure.

Hereinafter, a method for reducing the number of lines in the display device 100 according to embodiments of the present disclosure will be described.

Further, as an example of a method for reducing the number of lines, an integrated driving method for integrate and providing data voltage driving and reference voltage driving by utilizing an integrated line IL, a signal line connection structure for the integrated driving method, and an integrated driving circuit are presented. This is based on the assumption that the reference voltage line REFL and the data line DL are arranged in the same direction.

According to the integrated driving according to the present embodiments, the data voltage for the data driving and the reference voltage for the reference voltage driving can be supplied to the display panel 110 through the same line (hereinafter, referred to as the integrated line IL) between the source driver integrated circuit SDIC and the display panel 110.

Particularly, FIG. 5A illustrates a display panel 110 including a plurality of subpixels, a source driver integrated circuit 120 connected to the display panel 110, and a plurality of integrated driving units IDC1 and IDC2.

Referring to FIG. 5A, the display device 100 (see FIG. 1) can include a display panel 110, a source driver integrated circuit 120, and a plurality of integrated driving units IDC1 and IDC2. Other components included in the display device 100 have been described above with reference to FIGS. 1 and 2, and thus a description thereof is omitted.

In FIG. 5A, for convenience of description, it is exemplified that there are four data lines DL1 to DL4 and two integrated driving units (integrated driving circuits) IDC1 and IDC2, but the disclosure is not limited thereto.

An integrated driving system for data voltage driving and reference voltage driving according to embodiments of the disclosure can include a plurality of integrated driving units IDC1 and IDC2 for driving a plurality of data lines DL1 to DL4 and a plurality of reference voltage lines REFL1 and REFL2. Hereinafter, for convenience of description, a method for integrally driving the data line DL1 and the reference voltage line REFL1 by the integrated driving unit IDC1 is described. A method for integrally driving the data line DL2 and the reference voltage line REFL2 by the integrated driving unit IDC2 is the same as the driving method of the integrated driving unit IDC1.

The integrated driving unit IDC1 can integrate and provide functions of the data line DL1 and the reference voltage line REFL1.

The integrated driving system for data voltage driving and reference voltage driving according to an embodiment of the disclosure includes a signal line connection structure for integrally driving the data line DL1 and the reference voltage line REFL1.

FIG. 5B is a circuit diagram schematically illustrating a source drive integrated circuit, an integrated driving unit, and a display panel according to a first embodiment of the disclosure.

Referring to FIG. 5B, the source drive integrated circuit SDIC can output a data voltage Vdata1 to be supplied to the data line DL1 in a display mode period, and can output a reference voltage Vref to be supplied to the reference voltage line REFL. In this case, the source drive integrated circuit SDIC can allow the data voltage Vdata1 and the reference voltage Vref to be alternately transferred to the display panel 110 through the integrated line IL1 in the display mode period.

The source drive integrated circuit SDIC can include one or more latches, a digital-to-analog converter ADC, an output buffer, and the like.

The integrated driving unit IDC1 according to the first embodiment can include a first input node IN1, a second input node IN2, an integrated line IL1, a first output node OUT1, a second output node OUT2, and a plurality of switch elements SW1 to SW4.

The first input node IN1 can be disposed in the source driver integrated circuit 120 to receive a data voltage. In other words, the first input node IN1 can receive the data voltage Vdata1 output from the source drive integrated circuit SDIC.

The second input node IN2 can be disposed in the source driver integrated circuit 120 to receive the reference voltage Vref1. In other words, the second input node IN2 receives the reference voltage Vref1 output from the source drive integrated circuit SDIC. The reference voltage Vref1 can be applied from an external power supply source to the source drive integrated circuit SDIC.

The integrated line IL1 can electrically connect the first input node IN1 and the second input node IN2 in common.

The first output node OUT1 can be disposed in the display panel 110 and can be connected between the integrated line IL1 and the data line DL1. The first output node OUT1 can be connected to one end of the integrated line IL1, and when the first switch element SW1 is turned on, transfer the data voltage Vdata1 transferred from the integrated line IL1 to the data line DL1.

The first switch element SW1 can switch the connection between the first output node OUT1 and the data line DL1.

The second output node OUT2 can be disposed in the display panel 110 and can be connected between the integrated line IL1 and the reference voltage line REFL1. The second output node OUT2 can be connected to one end of the integrated line IL1, and when the second switch element SW2 is turned on, transfer the reference voltage Vref1 transferred from the integrated line IL1 to the reference voltage line REFL1.

The second switch element SW2 can switch the connection between the second output node OUT2 and the reference voltage line REFL1.

The third switch element SW3 can switch the connection between the first input node IN1 and the integrated line IL1.

The fourth switch element SW4 can switch the connection between the second input node IN2 and the integrated line IL1.

The first to fourth switch elements SW1 to SW4 can be provided as transistors.

The integrated line IL1 can be shared by the data line DL1 and the reference voltage line REFL1 by the source drive integrated circuit SDIC or the controller 140.

By the above-described structure, the integrated line IL1 can be disposed between the display panel 110 and the source drive integrated circuit 120, and can electrically connect the data line DL1 and the reference voltage line REFL1 in common.

Accordingly, since the data line DL1 and the reference voltage line REFL1 do not need to be separately formed between the display panel 110 and the source drive integrated circuit 120, the number of lines can be significantly reduced.

In other words, the total number of lines in the display panel 110 can be reduced by the number of reference voltage lines REFL.

FIG. 5C is a circuit diagram illustrating a connection structure between an integrated driving unit and a display panel according to a second embodiment of the disclosure. The circuit diagram of the second embodiment illustrated in FIG. 5C further includes an inverter INV and additional lines for connecting the inverter INV to the integrated driving unit IDC1 compared to the circuit diagram of the first embodiment illustrated in FIG. 5B.

Referring to FIG. 5C, the inverter INV can be connected between the first node Nd1 and the second node Nd2. The first node Nd1 is a node connected between the first switch element SW1 and the third switch element SW3, and the second node Nd2 is a node connected between the second switch element SW2 and the fourth switch element SW4.

The inverter INV can be provided in the integrated driving unit IDC1 so that the signal applied to the first input node IN1 is not transferred to the reference voltage line REFL1 and the signal applied to the second input node IN2 is not transferred to the data line DL1.

When the signal of the first node Nd1 is at a high level, since the signal of the first node Nd1 is inverted through the inverter INV and the signal of the low level is input to the second node Nd2, signal leakage can be prevented by preventing the signal of the first input node IN1 from being transferred to the second input node IN2.

Hereinafter, data driving of integrated driving of an integrated driving circuit according to the first embodiment of the disclosure is described with reference to FIGS. 6A and 6B.

Figure 6A:
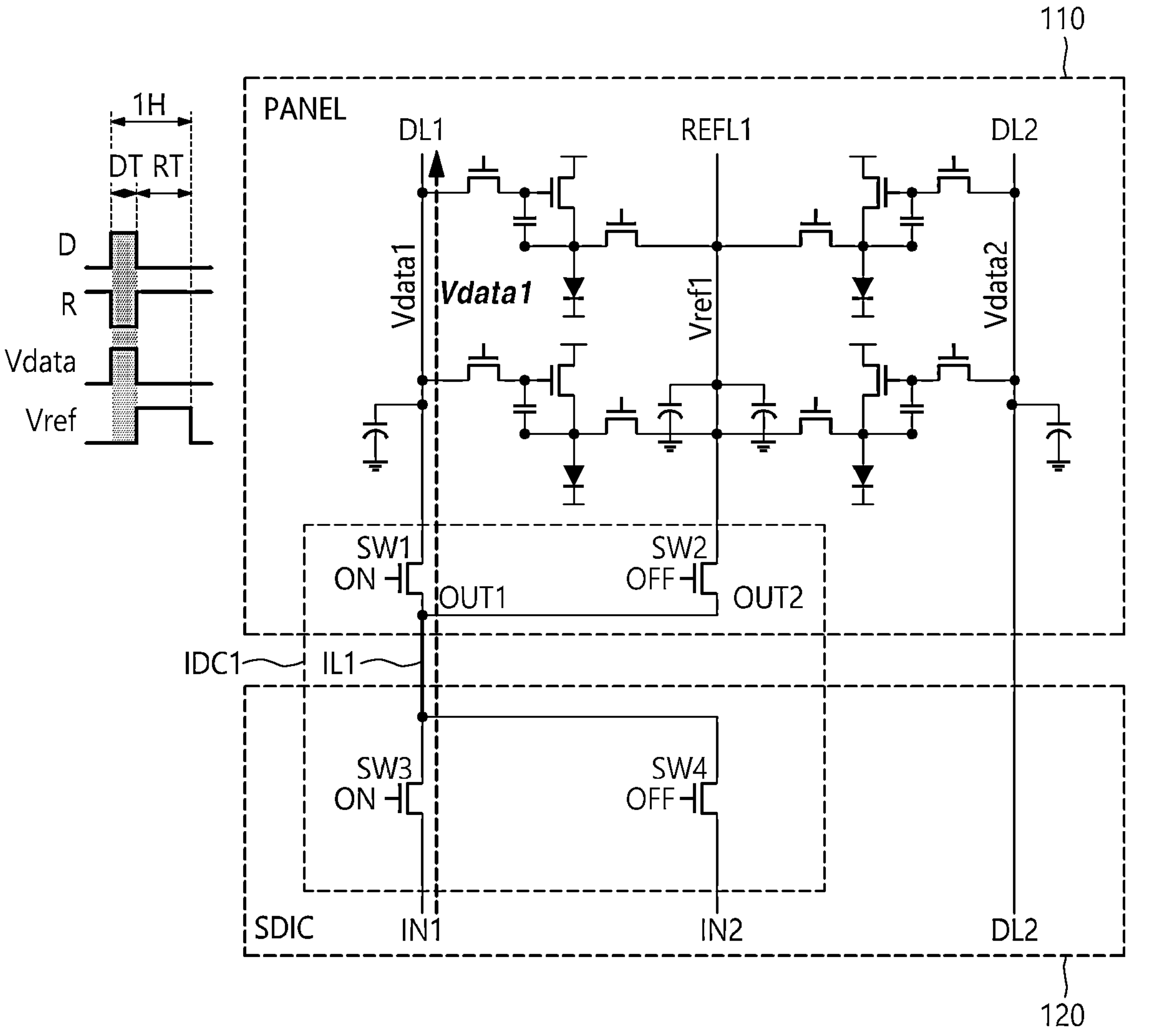
FIGS. 6A and 6B are views illustrating an example of data driving of integrated driving of an integrated driving circuit according to a first embodiment of the disclosure.
Figure 6B:
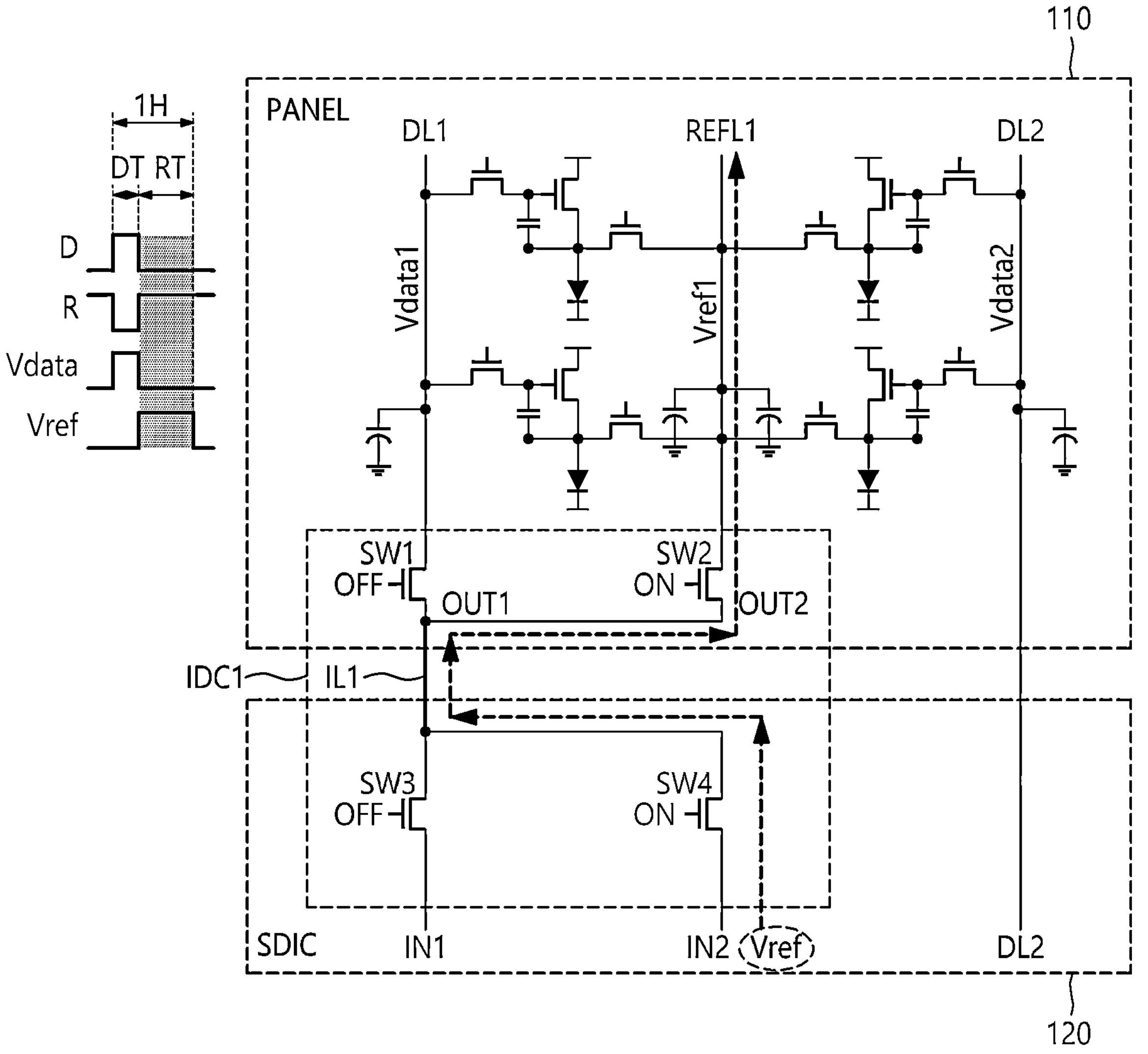

FIG. 6A is a circuit diagram illustrating data driving based on an integrated driving unit IDC1 according to the first embodiment of the disclosure, and FIG. 6B is a circuit diagram illustrating reference voltage driving based on an integrated driving unit IDC1 according to the first embodiment of the disclosure.

Referring to FIG. 6A, as shown in a driving waveform diagram, a 1 horizontal period 1H includes a data driving period DT and a reference voltage driving period RT.

A data voltage Vdata1 can be applied to the first input node IN1 during the data driving period DT of the 1 horizontal period. As the first switch element SW1 and the third switch element SW3 are turned on during the data driving period DT, the first input node IN1, the integrated line IL1, and the data line DL1 can be electrically connected. Accordingly, the data voltage Vdata1 applied to the first input node IN1 can be supplied from the first input node IN1 to the data line DL1 connected to the subpixels via the integrated line IL1.

During the data driving period DT, the source drive integrated circuit SDIC can turn off the second switch element SW2 and the fourth switch element SW4, thereby deactivating the reference voltage line REFL1.

Referring to FIG. 6B, when the reference voltage driving period RT arrives following the data driving period DT, the source drive integrated circuit SDIC can apply the reference voltage Vref1 to the second input node IN2.

As the second switch element SW2 and the fourth switch element SW4 are turned on during the reference voltage driving period RT, the second input node IN2, the integrated line IL1, and the reference voltage line REFL1 can be electrically connected. Accordingly, the reference voltage Vref1 applied to the second input node IN2 can be supplied from the second input node IN2 to the reference voltage line REFL1 via the integrated line IL1.

During the reference voltage driving period RT, the source drive integrated circuit SDIC can turn off the first switch element SW1 and the third switch element SW3, thereby deactivating the data line DL1.

As the 1 horizontal period is repeated in this manner, the source drive integrated circuit SDIC can alternately supply the data voltage Vdata1 and the reference voltage Vref1 to the subpixels through the integrated driving unit IDC.

This is possible because the integrated line IL1 is commonly connected to the data line DL1 and the reference voltage line REFL1, and thus the integrated line IL1 can be shared for data driving and reference voltage driving.

By using the above-described integrated driving unit IDC1, data driving and reference voltage driving can be integrated and provided, and the data voltage Vdata1 for data driving and the reference voltage Vref for reference voltage driving can be output to one same integrated line IL1. Accordingly, the number of output lines of the integrated driving unit IDC can be significantly reduced.

Accordingly, since the integrated driving unit IDC according to the present embodiments can have only a small number of output channels, circuit design can be easy and simple. Further, by using the integrated driving unit IDC according to the present embodiments, it is possible to reduce the number of lines of the display panel 110.

Hereinafter, reference voltage driving of integrated driving of an integrated driving circuit according to the second embodiment of the disclosure is described with reference to FIGS. 7A and 7B.

Figure 7A:
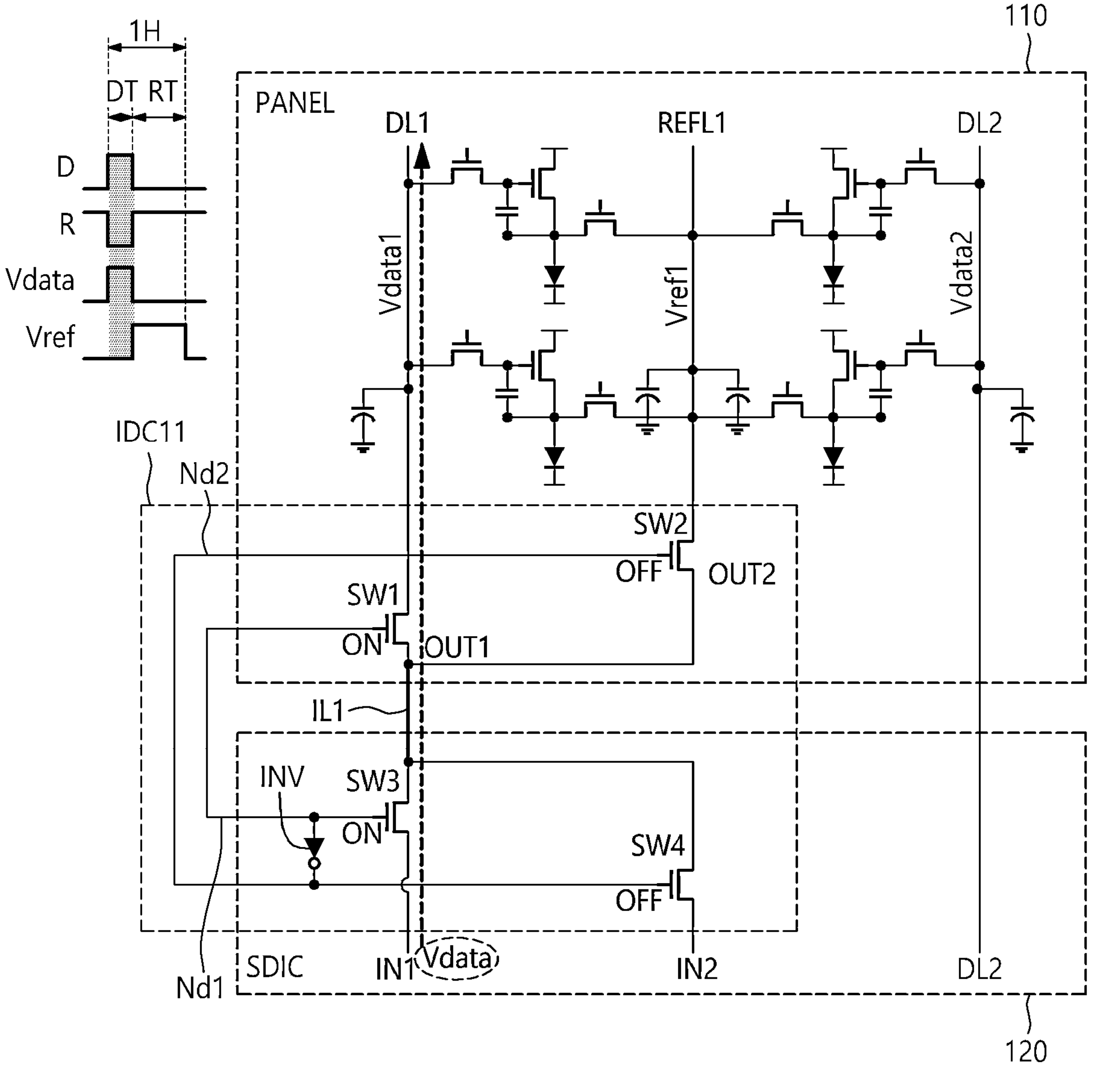
FIGS. 7A and 7B are views illustrating an example of reference voltage driving of integrated driving of an integrated driving circuit according to a second embodiment of the disclosure.
Figure 7B:
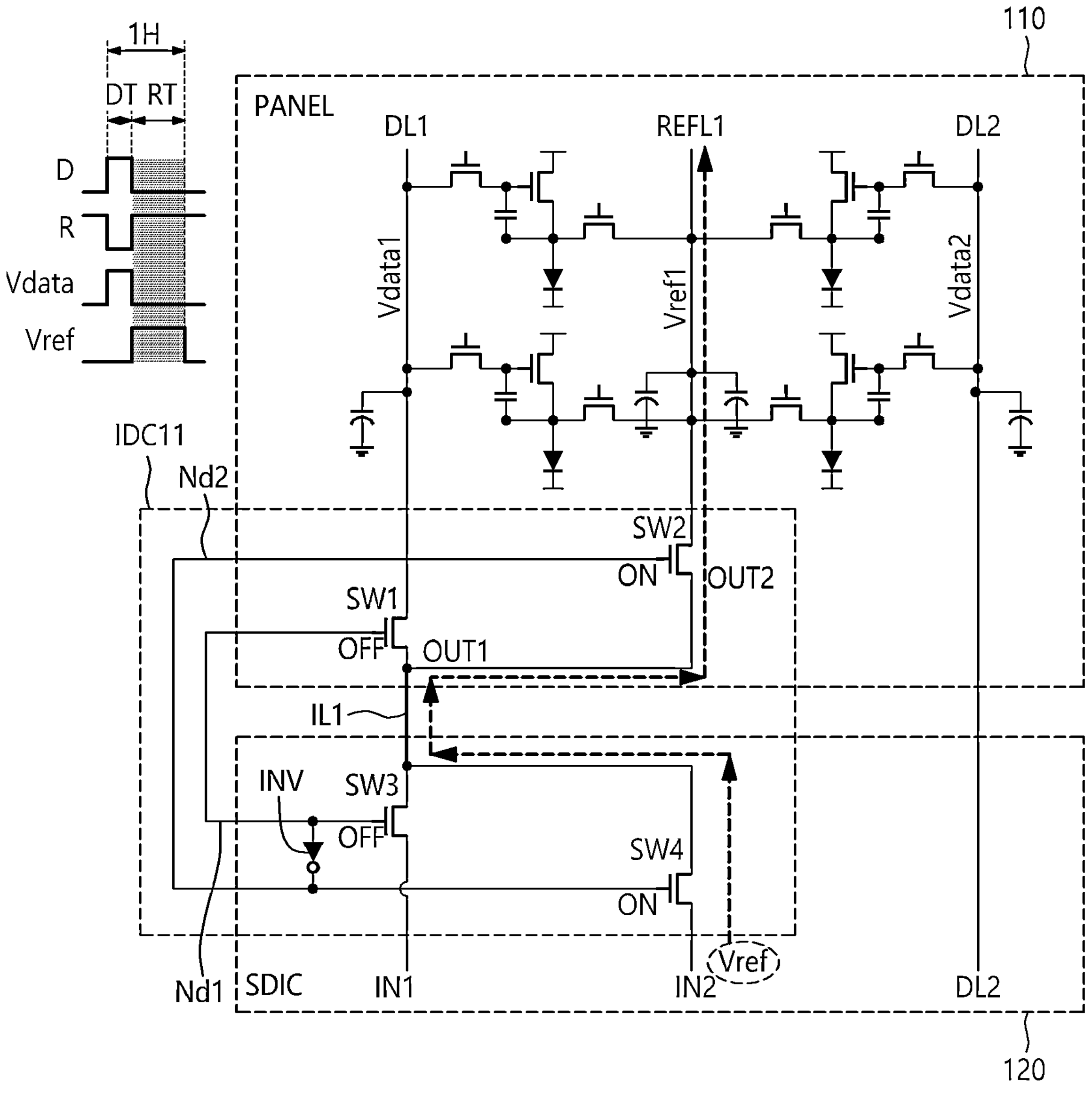

FIG. 7A is a circuit diagram illustrating data driving based on an integrated driving unit IDC11 according to the second embodiment of the disclosure, and FIG. 7B is a circuit diagram illustrating reference voltage driving based on an integrated driving unit IDC11 according to the second embodiment of the disclosure.

Referring to FIG. 7A, as shown in a driving waveform diagram, a 1 horizontal period 1H includes a data driving period DT and a reference voltage driving period RT.

A data voltage Vdata1 can be applied to the first input node IN1 during the data driving period DT of the 1 horizontal period. As the first switch element SW1 and the third switch element SW3 are turned on during the data driving period DT, the first input node IN1, the integrated line IL1, and the data line DL1 can be electrically connected. Accordingly, the data voltage Vdata1 applied to the first input node IN1 can be supplied from the first input node IN1 to the data line DL1 connected to the subpixels via the integrated line IL1.

During the data driving period DT, the source drive integrated circuit SDIC can turn off the second switch element SW2 and the fourth switch element SW4, thereby deactivating the reference voltage line REFL1.

In this case, when the signal of the first node Nd1 is at a high level, since the signal of the first node Nd1 is inverted through the inverter INV and the signal of the low level is input to the second node Nd2, signal leakage can be prevented by preventing the signal of the first input node IN1 from being transferred to the second input node IN2.

Referring to FIG. 7B, when the reference voltage driving period RT arrives following the data driving period DT, the source drive integrated circuit SDIC can apply the reference voltage Vref1 to the second input node IN2.

As the second switch element SW2 and the fourth switch element SW4 are turned on during the reference voltage driving period RT, the second input node IN2, the integrated line IL1, and the reference voltage line REFL1 can be electrically connected. Accordingly, the reference voltage Vref1 applied to the second input node IN2 can be supplied from the second input node IN2 to the reference voltage line REFL1 via the integrated line IL1.

During the reference voltage driving period RT, the source drive integrated circuit SDIC can turn off the first switch element SW1 and the third switch element SW3, thereby deactivating the data line DL1.

As the 1 horizontal period is repeated in this manner, the source drive integrated circuit SDIC can alternately supply the data voltage Vdata1 and the reference voltage Vref1 to the subpixels through the integrated driving unit IDC.

This is possible because the integrated line IL1 is commonly connected to the data line DL1 and the reference voltage line REFL1, and thus the integrated line IL1 can be shared for the driving for supplying the data voltage and the driving for supplying the reference voltage.

Figure 8A:
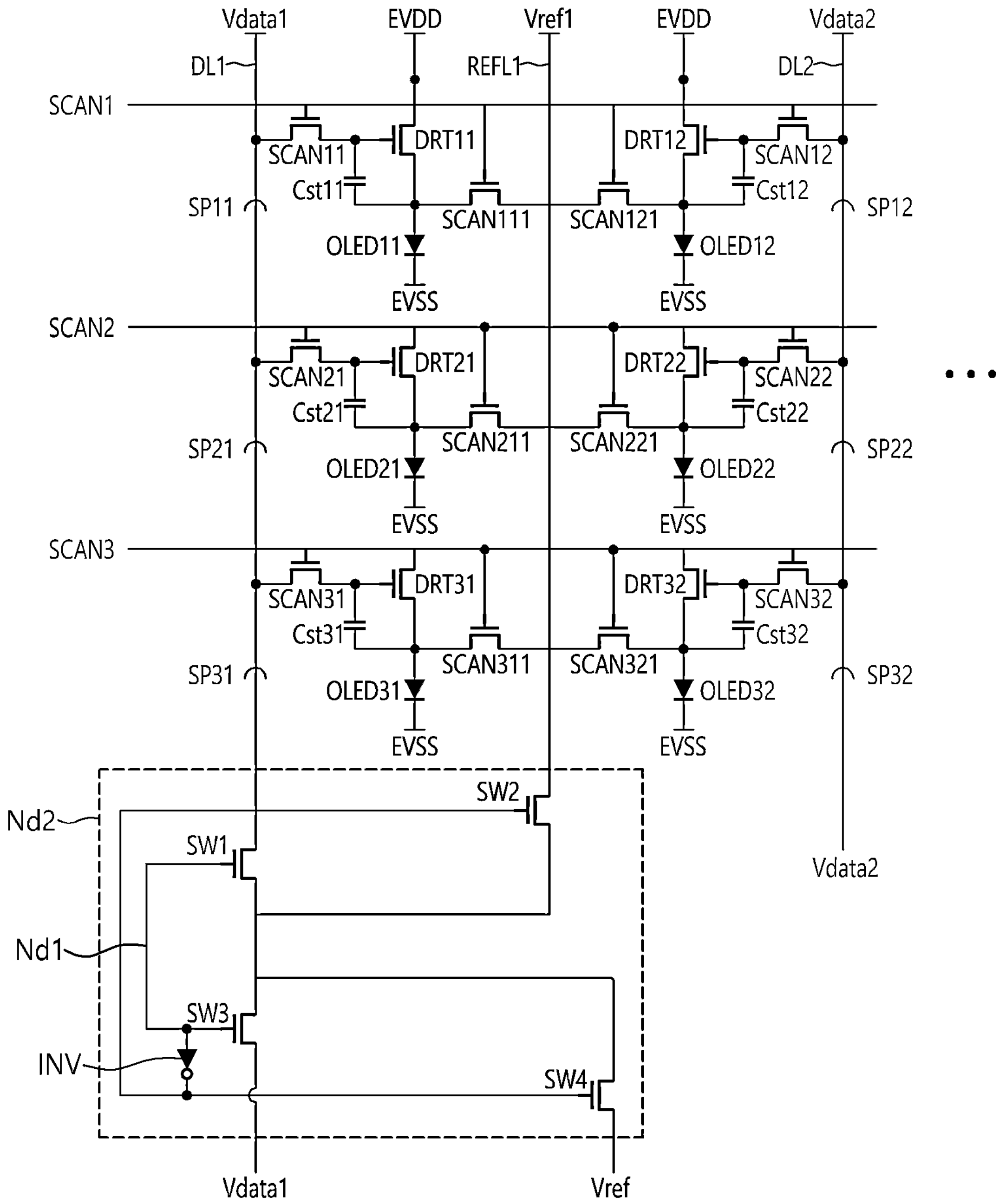
FIG. 8A is a view illustrating an example circuit of a display device for integrated driving according to an embodiment of the disclosure.
Figure 8B:
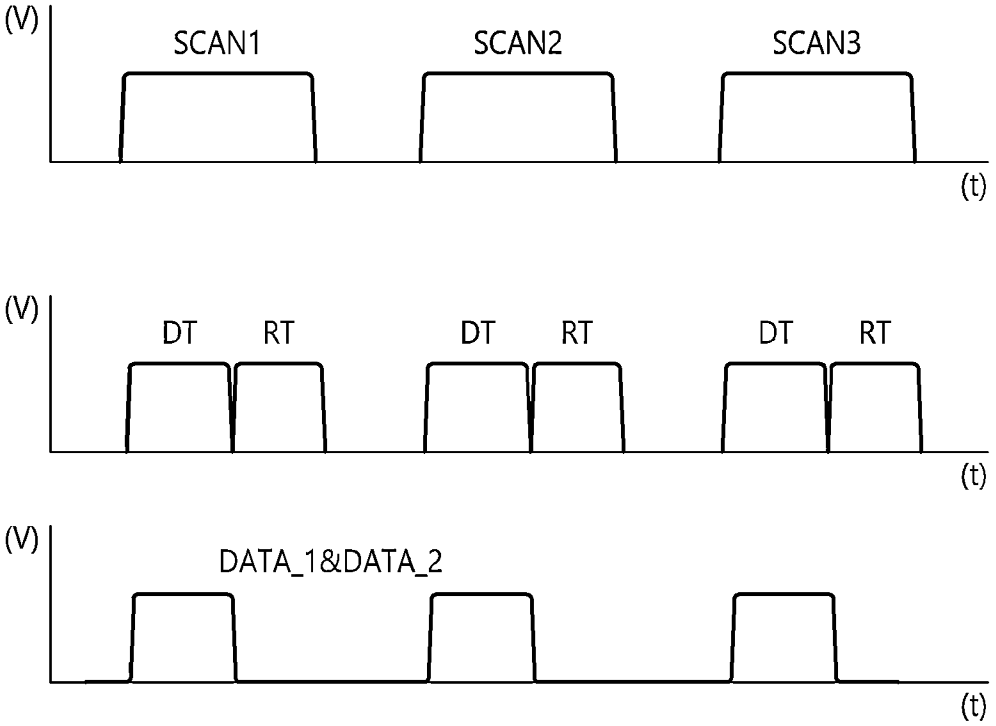
FIG. 8B is a view illustrating waveforms of main signals by integrated driving according to an embodiment of the disclosure.
Figure 8C:
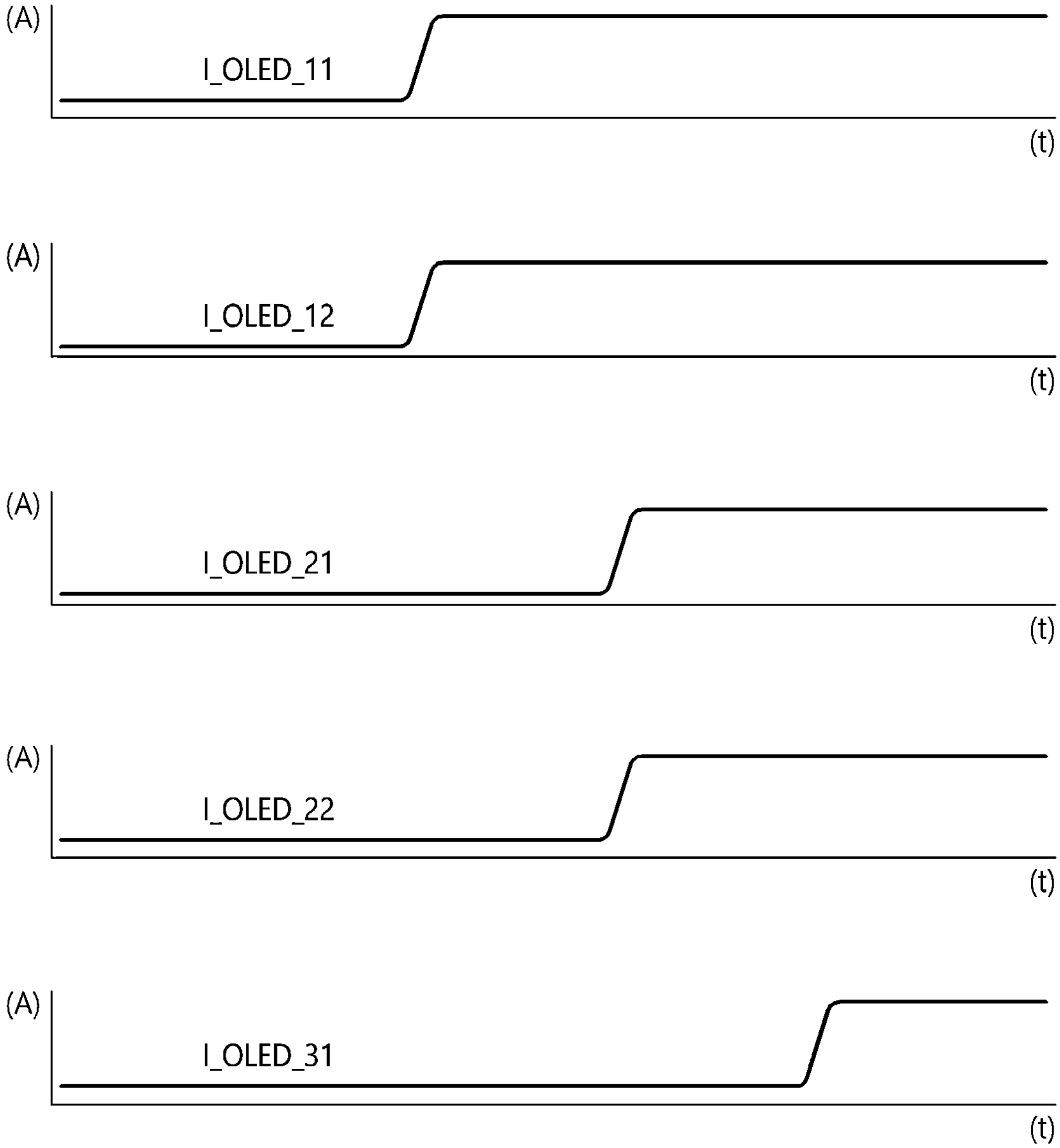
FIG. 8C is a view illustrating waveforms of current flowing to light emitting elements by integrated driving according to an embodiment of the disclosure.

FIG. 8A is a view illustrating an example circuit of a display device for integrated driving according to an embodiment of the disclosure. FIG. 8B is a view illustrating waveforms of main signals by integrated driving according to an embodiment of the disclosure. FIG. 8C is a view illustrating waveforms of current flowing to light emitting elements by integrated driving according to an embodiment of the disclosure.

Referring to FIGS. 8A and 8B, in the display mode period, the N scan transistors SCAN11 to SCAN321 can determine the connection between the gate nodes of the driving transistors DRT11 to DRT32 and the corresponding data lines among the plurality of data lines in response to the scan signals SCAN1, SCAN2, and SCAN3 sequentially supplied from the corresponding scan lines among the plurality of scan lines.

During the display mode period, the source drive integrated circuit SDIC sequentially outputs the data voltage Vdata1 to be supplied to the n subpixels SP11, SP32 to one data line DL1.

Accordingly, the data voltage can be applied to the activated data line DL1 from the source drive integrated circuit SDIC every 1 horizontal period, and the reference voltage can be applied after the data voltage is applied.

Specifically, as described with reference to FIGS. 6A and 7A, the data voltage Vdata1 can be applied to the first input node IN1 during the data driving period DT of the 1 horizontal period. As the first switch element SW1 and the third switch element SW3 are turned on during the data driving period DT, the first input node IN1, the integrated line IL1, and the data line DL1 can be electrically connected. Accordingly, the data voltage Vdata1 applied to the first input node IN1 can be supplied from the first input node IN1 to the data line DL1 connected to the subpixels via the integrated line IL1.

During the data driving period DT, the source drive integrated circuit SDIC can turn off the second switch element SW2 and the fourth switch element SW4, thereby deactivating the reference voltage line REFL1.

Referring to FIG. 7B, when the reference voltage driving period RT arrives following the data driving period DT, the source drive integrated circuit SDIC can apply the reference voltage Vref1 to the second input node IN2. In the waveform diagram of FIG. 8B, it can be identified that the waveforms of the data driving period DT and the reference voltage driving period RT alternately appear, and the waveforms of the first data voltage Vdata1 and the second data voltage Vdata2 simultaneously appear during the data driving period DT.

As the second switch element SW2 and the fourth switch element SW4 are turned on during the reference voltage driving period RT, the second input node IN2, the integrated line IL1, and the reference voltage line REFL1 can be electrically connected. Accordingly, the reference voltage Vref1 applied to the second input node IN2 can be supplied from the second input node IN2 to the reference voltage line REFL1 via the integrated line IL1.

During the reference voltage driving period RT, the source drive integrated circuit SDIC can turn off the first switch element SW1 and the third switch element SW3, thereby deactivating the data line DL1.

As the 1 horizontal period is repeated in this manner, the source drive integrated circuit SDIC can alternately supply the data voltage Vdata1 and the reference voltage Vref1 to the subpixels through the integrated driving unit IDC.

Since the integrated line IL1 is commonly connected to the data line DL1 and the reference voltage line REFL1, the integrated line IL1 can be shared for the driving for supplying the data voltage and the driving for supplying the reference voltage.

As a result of supplying the data voltage and the reference voltage to the subpixels through the integrated line IL1, as illustrated in FIG. 8C, it can be identified that the current flowing through the organic light emitting elements OLED11 to OLED31 is normally saturated to a predetermined current to emit light.

Embodiments of the disclosure described above are briefly described below.

A display device according to an embodiment of the disclosure can comprise a display panel where a plurality of subpixels defined by a plurality of data lines, a plurality of reference voltage lines, and a plurality of gate lines are arranged, a source driver integrated circuit configured to drive the plurality of data lines and the plurality of reference voltage lines, and an integrated driving unit alternately outputting a data voltage and a reference voltage to one line shared by one data line among the plurality of data lines and one reference voltage line among the plurality of reference voltage lines.

The integrated driving unit can include a first input node disposed in the source driver integrated circuit to receive a data voltage, a second input node disposed in the source driver integrated circuit to receive a reference voltage, an integrated line electrically connecting the first input node and the second input node in common, a first output node disposed in the display panel and connected between the integrated line and the data line, and a second output node disposed in the display panel and connected between the integrated line and the reference voltage line.

The integrated driving unit can further include a first switch element switching connection between the first output node and the data line, a second switch element switching connection between the second output node and the reference voltage line, a third switch element switching connection between the first input node and the integrated line, and a fourth switch element switching connection between the second input node and the integrated line.

The display device can further comprise a first node connected between the first switch element and the third switch element, a second node connected between the second switch element and the fourth switch element, and an inverter connected between the first node and the second node.

The integrated line can be disposed between the display panel and the source driver integrated circuit.

The integrated line can extend to the data line or can be electrically connected to the data line.

The source driver integrated circuit can sequentially apply the data voltage and the reference voltage to the integrated line in a 1 horizontal period.

The source driver integrated circuit can alternately apply the data voltage and the reference voltage to the integrated line while the 1 horizontal period is repeated.

During a data voltage supply period of a 1 horizontal period, the data voltage can be applied to the first input node, and the first switch element and the third switch element can be turned on to electrically connect the first input node, the integrated line, and the data line.

During a data voltage supply period of a 1 horizontal period, the second switch element and the fourth switch element can be turned off.

When a reference voltage supply period arrives after a data voltage supply period of a 1 horizontal period, the reference voltage can be applied to the second input node, and the second switch element and the fourth switch element can be turned on to electrically connect the second input node, the integrated line, and the reference voltage line.

During a reference voltage supply period of a 1 horizontal period, the first switch element and the third switch element can be turned off.

An integrated driving circuit according to an embodiment of the disclosure can comprise a first input node disposed in a source driver integrated circuit to receive a data voltage, a second input node disposed in the source driver integrated circuit to receive a reference voltage, an integrated line electrically connecting the first input node and the second input node in common, a first output node disposed in a display panel and connected between the integrated line and the data line, a second output node disposed in the display panel and connected between the integrated line and the reference voltage line, a first switch element switching connection between the first output node and the data line, a second switch element switching connection between the second output node and the reference voltage line, a third switch element switching connection between the first input node and the integrated line, and a fourth switch element switching connection between the second input node and the integrated line.

The above description has been presented to enable any person skilled in the art to make and use the technical idea of the disclosure, and has been provided in the context of a particular application and its requirements. Various modifications, additions and substitutions to the described embodiments will be readily apparent to those skilled in the art, and the general principles defined herein can be applied to other embodiments and applications without departing from the spirit and scope of the disclosure. The above description and the accompanying drawings provide an example of the technical idea of the disclosure for illustrative purposes only. For example, the disclosed embodiments are intended to illustrate the scope of the technical idea of the disclosure.

What is claimed:

1. A display device, comprising:

a display panel including a plurality of subpixels defined by a plurality of data lines, a plurality of reference voltage lines, and a plurality of gate lines;

a source driver integrated circuit configured to drive the plurality of data lines and the plurality of reference voltage lines; and an integrated driving unit configured to alternately output a data voltage and a reference voltage to one line shared by one data line among the plurality of data lines and one reference voltage line among the plurality of reference voltage lines.

2. The display device of claim 1, wherein the integrated driving unit includes:

a first input node disposed in the source driver integrated circuit to receive the data voltage;

a second input node disposed in the source driver integrated circuit to receive the reference voltage;

an integrated line electrically connecting the first input node and the second input node in common;

a first output node disposed in the display panel and connected between the integrated line and the one data line; and a second output node disposed in the display panel and connected between the integrated line and the one reference voltage line.

3. The display device of claim 2, wherein the integrated driving unit further includes:

a first switch element switching connection between the first output node and the one data line;

a second switch element switching connection between the second output node and the one reference voltage line;

a third switch element switching connection between the first input node and the integrated line; and a fourth switch element switching connection between the second input node and the integrated line.

4. The display device of claim 3, further comprising:

a first node connected between the first switch element and the third switch element;

a second node connected between the second switch element and the fourth switch element; and an inverter connected between the first node and the second node.

5. The display device of claim 3, wherein during a data voltage supply period of a 1 horizontal period, the data voltage is applied to the first input node, and the first switch element and the third switch element are turned on to electrically connect the first input node, the integrated line, and the one data line.

6. The display device of claim 3, wherein during a data voltage supply period of a 1 horizontal period, the second switch element and the fourth switch element are turned off.

7. The display device of claim 3, wherein when a reference voltage supply period arrives after a data voltage supply period of a 1 horizontal period, the reference voltage is applied to the second input node, and the second switch element and the fourth switch element are turned on to electrically connect the second input node, the integrated line, and the one reference voltage line.

8. The display device of claim 3, wherein during a reference voltage supply period of a 1 horizontal period, the first switch element and the third switch element are turned off.

9. The display device of claim 2, wherein the integrated line is disposed between the display panel and the source driver integrated circuit.

10. The display device of claim 2, wherein the integrated line extends to the one data line or is electrically connected to the one data line.

11. The display device of claim 2, wherein the source driver integrated circuit sequentially applies the data voltage and the reference voltage to the integrated line in a 1 horizontal period.

12. The display device of claim 11, wherein the source driver integrated circuit alternately applies the data voltage and the reference voltage to the integrated line while the 1 horizontal period is repeated.

13. An integrated driving circuit, comprising:

a first input node disposed in a source driver integrated circuit to receive a data voltage;

a second input node disposed in the source driver integrated circuit to receive a reference voltage;

an integrated line electrically connecting the first input node and the second input node in common;

a first output node disposed in a display panel and connected between the integrated line and a data line;

a second output node disposed in the display panel and connected between the integrated line and a reference voltage line;

a first switch element switching connection between the first output node and the data line;

a second switch element switching connection between the second output node and the reference voltage line;

a third switch element switching connection between the first input node and the integrated line; and a fourth switch element switching connection between the second input node and the integrated line.

14. The integrated driving circuit of claim 13, further comprising:

a first node connected between the first switch element and the third switch element;

a second node connected between the second switch element and the fourth switch element; and an inverter connected between the first node and the second node.

15. The integrated driving circuit of claim 13, wherein the integrated line is disposed between the display panel and the source driver integrated circuit.

16. A display device comprising:

the integrated driving circuit of claim 13; and the display panel including a plurality of subpixels, and configured to receive the data voltage and the reference voltage for at least one of the plurality of subpixels from the integrated driving circuit.

* * * * *